US011698992B2

(12) United States Patent
Kotsogiannis Teftsoglou et al.

(10) Patent No.: US 11,698,992 B2
(45) Date of Patent: Jul. 11, 2023

(54) PRIVACY-SAFE CONNECTION RECOMMENDATIONS

(71) Applicant: Snap Inc., Santa Monica, CA (US)

(72) Inventors: Ioannis Kotsogiannis Teftsoglou, Santa Monica, CA (US); Amit Datta, Los Angeles, CA (US); Liviu Cristea, Lynnwood, WA (US)

(73) Assignee: SNAP INC., Santa Monica, CA (US)

( * ) Notice: Subject to any disclaimer, the term of this patent is extended or adjusted under 35 U.S.C. 154(b) by 57 days.

(21) Appl. No.: 17/513,015

(22) Filed: Oct. 28, 2021

(65) Prior Publication Data

US 2023/0062102 A1 Mar. 2, 2023

(30) Foreign Application Priority Data

Sep. 1, 2021 (GR) .............................. 20210100577

(51) Int. Cl.
 *G06F 15/16* (2006.01)
 *G06F 21/62* (2013.01)
 *H04L 51/42* (2022.01)
 *H04L 51/52* (2022.01)
(52) U.S. Cl.
 CPC .......... *G06F 21/6263* (2013.01); *H04L 51/42* (2022.05); *H04L 51/52* (2022.05)
(58) Field of Classification Search
 CPC ...... G06F 21/6263; H04L 51/42; H04L 51/52

USPC ......................................................... 709/206
See application file for complete search history.

(56) References Cited

U.S. PATENT DOCUMENTS

| 2015/0120960 | A1* | 4/2015 | Peylo .................... H04W 12/02 |
| | | | 709/238 |
| 2020/0356858 | A1* | 11/2020 | Hegde .................... G06F 17/16 |
| 2021/0271688 | A1* | 9/2021 | Allen .................... H04W 84/18 |

OTHER PUBLICATIONS

Modeling Relationship Strength in Online Social Network (Rongjing Xiang; Jennifer Neville; Monica Rogati), (Year: Apr. 26-30, 2010).*
Dinur, Irit, "Revealing Information while Preserving Privacy", ACM; PODS 2003, San Diego, CA, (Jun. 2003), 202-210.

* cited by examiner

*Primary Examiner* — Yves Dalencourt
(74) *Attorney, Agent, or Firm* — Schwegman Lundberg & Woessner, P.A.

(57) ABSTRACT

When a messaging system generates connection recommendations for a new user, who first registers with the messaging system, the signals available for generation of recommendations may be limited to the user's contact book matches. Using just this limited signal poses a concern associated with leaking information about users represented by the recommendations. The technical problem of generating connection recommendations for a user at registration time in a privacy-safe manner is addressed by a recommendation methodology that obscures the connection source and the connection distance of the recommended profiles.

20 Claims, 7 Drawing Sheets

PRIVACY-SAFE CONNECTION RECOMMENDATIONS

CLAIM OF PRIORITY

This application claims the benefit of priority to Greece Patent Application Serial No. 20210100577, filed Sep. 1, 2020, which is incorporated herein by reference in its entirety.

TECHNICAL FIELD

The present disclosure generally relates to data analysis. Specifically, but not by way of limitations, systems and methods herein describe generating connection recommendations in a privacy-safe manner.

BACKGROUND

The popularity of computer-implemented programs that permit users to access and interact with content and other users online continues to grow. Various computer-implemented applications exist that permit users to share content with other users through messaging clients. Some of such computer-implemented applications, termed apps, are installed directly onto a mobile device such as a phone, a tablet, or a wearable device. An application may have a backend service provided on a server computer system to perform operations that may require resources greater than is reasonable to perform at a client device (e.g., storing large amounts of data or performing computationally expensive processing). For example, a messaging client and the associated messaging server system, collectively referred to as a messaging system, may be configured to permit online users to share content. A messaging system may be viewed as a platform for connecting people in virtual space by permitting users to designate other users as connections. Each user of a messaging system is represented by a user profile (also referred to as a user or simply a profile). A user's connection to other users of the messaging system may be indicated by respective connection links included in or associated with the user's profile.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

A messaging system that permits users to designate other users as connections is configured to provide connection recommendations users. Connection recommendations for a user may be generated every time when the user logs into the messaging system, utilizing signals such as features present in and derived from user profiles, behavior of the user in the messaging system, and the social graph maintained by the messaging system that stores connection information that indicates relationships between profiles representing users in the messaging system. It will be noted that references to a user's connections in the messaging system will be understood as connections between the profile representing the user and profiles representing other users.

When a new user is accessing the messaging system for the first time, for the purpose of becoming a registered user represented by a user profile, the information available to the messaging system for generation of the connection recommendations may be limited, as a newly-registered user may not have connected with other users yet and has not yet had a chance to interact with the messaging system enough for the system to store any behavior-related information about the new user. Provided the new user uploaded or permitted the messaging system to access their contact book information, the messaging system can use the contact book information of the new user as a starting point for generating connection recommendations. For the purposes of this description, a contact book match is a profile in the messaging system representing a user identified in the contact book of another user. Given such a limited signal for recommendations generation at registration time, there is a concern associated with leaking information about users represented by the recommended profiles.

The technical problem of generating meaningful connection recommendations for a new user at registration time in a privacy-safe manner is addressed by providing the connection recommendation system and the methodology described herein. Some of the privacy protection mechanisms provided by the connection recommendation system entail establishing criteria for contact book matches that can be used in the recommendation generation process, selecting recommendations from profiles connected to the contact book matches and not from the contact book matches themselves, and preserving substantially the same ratios between different categories of the profiles in the recommendations provided to a new user and in the inventory of potential recommendations.

The connection recommendation methodology described herein contributes to preserving privacy of users of the messaging system by concealing information about connection distance of a recommended profile from the profile that represents the new user, in addition to concealing the nature of the connection between a recommended profile and the profile that represents the new user (whether it is a contact book connection, a social network connection, or a combination of both, for example).

A social network connection is a connection where two users of the messaging system each indicated consent to be each other's connections in the messaging system. A contact book connection between two user profiles in the messaging system is a connection where one profile includes or references contact book information of the user represented by the other profile. A contact book connection between two user profiles may be one-directional (where only one of the two profiles includes or references contact book information of the user represented by the other profile) or bidirectional (where the first profile includes or references contact book information of the user represented by the other profile and the first profile includes or references contact book information of the user represented by the first profile). A contact book connection is referred to as outlink with respect to a given user, where the given user has the contact book information of the other user). A contact book connection is referred to as inlink with respect to a given user, where the other user has the contact book information of the given user). A bidirectional contact book connection can be considered as both an inlink and an outlink contact book connection.

A connection distance indicates a degree of association between two profiles in the messaging system. For example, a one-hop connection between two profiles indicates that at least one of the profiles includes connection information with respect to the other profile. A two-hop connection between two profiles, neither of which include connection information with respect to the other profile, indicates that one of these two profiles includes connection information with respect to a profile that includes connection information with respect to the other profile, and so on. Other aspects of the connection recommendation system are described further below.

It will be noted that the methodology described herein can be used beneficially in any system that that permits users to designate other users as connections and where providing connection recommendations in a privacy-safe manner is desirable.

Networked Computing Environment

Figure 1:
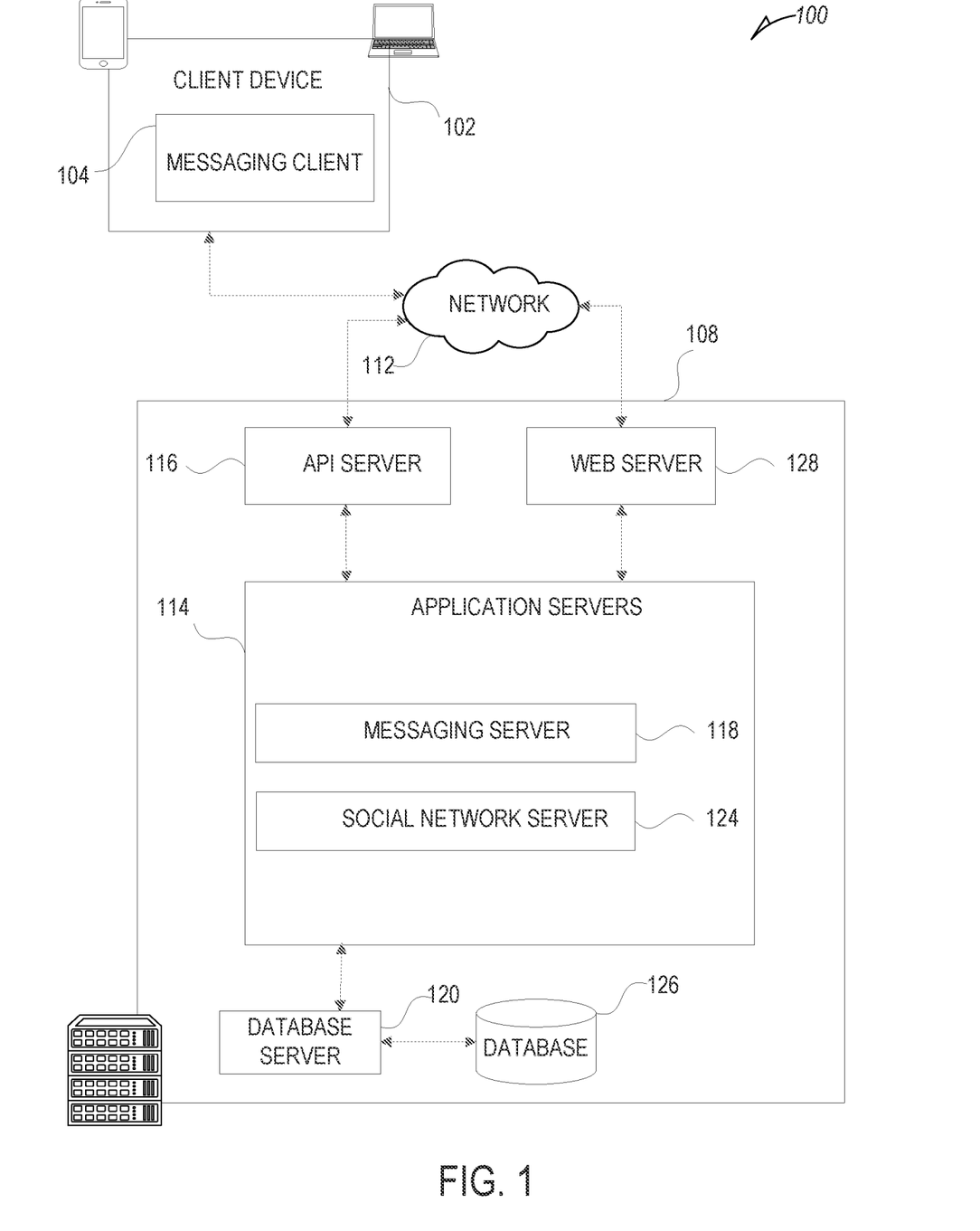
FIG. 1 is a diagrammatic representation of a networked environment, in which a privacy-safe connection recommendations system may be deployed, in accordance with some examples.

FIG. 1 is a block diagram showing an example networking environment 100 for exchanging data (e.g., messages and associated content) over a network. The networking environment 100 includes multiple instances of a client device 102, each of which hosts a number of applications, including a messaging client 104 and other applications. Each messaging client 104 is communicatively coupled to other instances of the messaging client 104 (e.g., hosted on respective other client devices 102) and a messaging server system 108 via a network 112 (e.g., the Internet). A messaging client 104 can also communicate with locally-hosted applications using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the networking environment 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the networking environment 100 are invoked and controlled through functions available via user interfaces (UIs) of the messaging client 104.

Turning now specifically to the messaging server system 108, an Application Program interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118 and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The social network server 124 supports various social networking functions and services and makes these functions and services available to the messaging server 118. To this end, the social network server 124 maintains and accesses an entity graph, profile data, and entity data within the database 126. The entity graph, the profile data, and the entity data are described further below, with reference to FIG. 3, Examples of functions and services supported by the social network server 124 include the identification of other users of the networking environment 100 with which a particular user has connections, social network connections and contact book connections, for example) and also the identification of other entities and interests of a particular user.

In some examples, the social network server 124 supports a connection recommendations system configured to recommend new connections to users of the messaging systems in a privacy-safe manner. Connection recommendations are generated when a user logs into the messaging system. The first time a given user is provided with connection recommendations is at registration time, using the methodologies described herein. Connection recommendations are generated using information that is present or derived from the entity graph, the profile data, and the entity data.

The messaging client 104 can notify a user of the client device 102, or other users related to such a user (e.g., social network connections of that user), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

System Architecture

Figure 2:
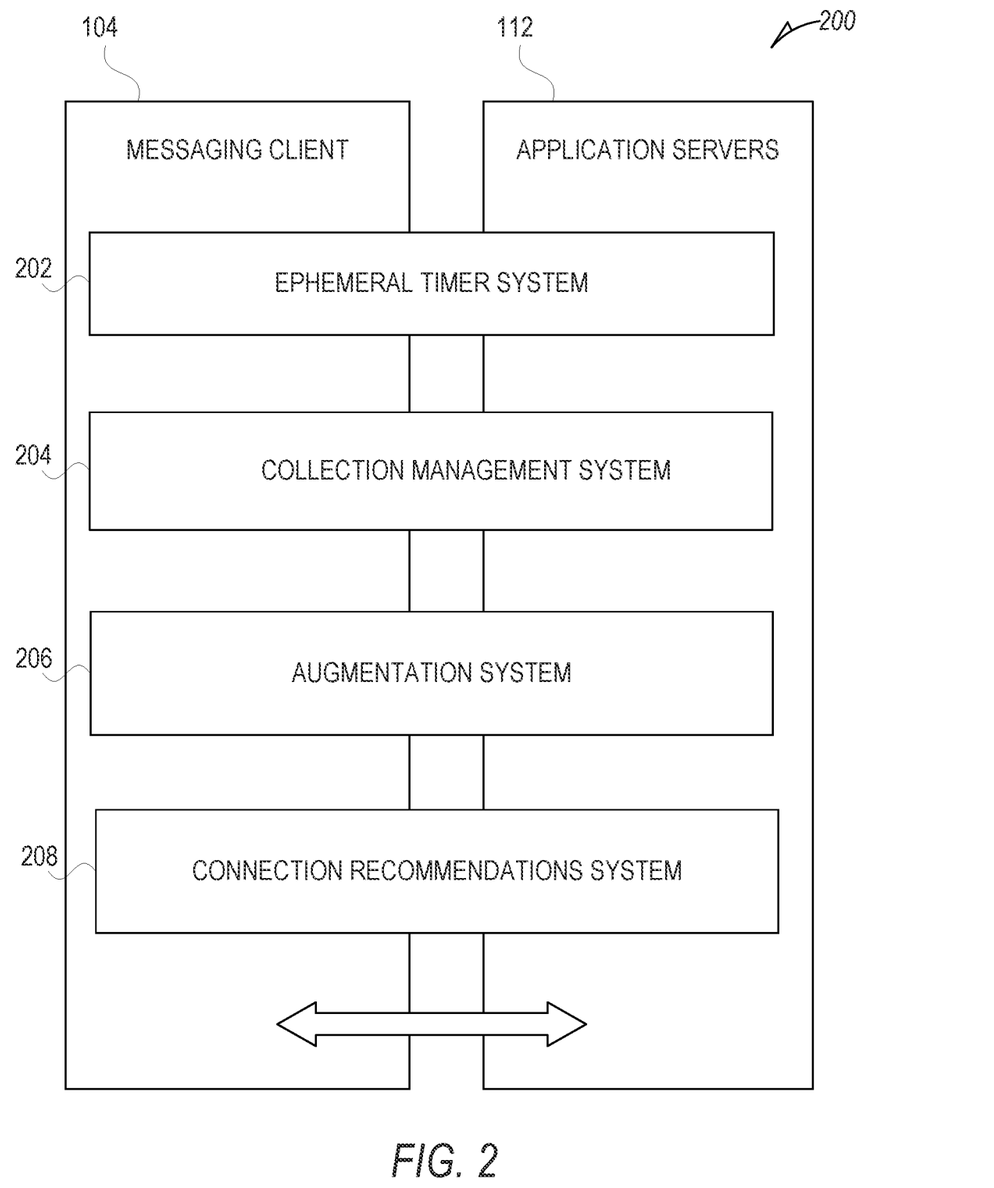
FIG. 2 is a diagrammatic representation of a messaging system, in accordance with some examples, that has both client-side and server-side functionality.

FIG. 2 is a block diagram of a system 200, which embodies a number of subsystems that are supported on the client-side by the messaging client 104 and on the sever-side by the application servers 114. These subsystems include, for example, an ephemeral timer system 202, a collection management system 204, and augmentation system 206, and a connection recommendations system 208.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The augmentation system 206 provides various functions that enable a user to augment (e.g., annotate or otherwise modify or edit) media content, which may be associated with a message. For example, the augmentation system 206 provides functions related to the generation and publishing of media overlays for messages processed by the messaging system. The media overlays may be stored in the database 126 and accessed through the database server 118.

The connection recommendations system 208 is configured to generate connection recommendations in a privacy-safe manner, by obscuring the connection source and the connection distance of the recommended profiles, as described in detail further below, with reference to FIG. 4.

Data Architecture

Figure 3:
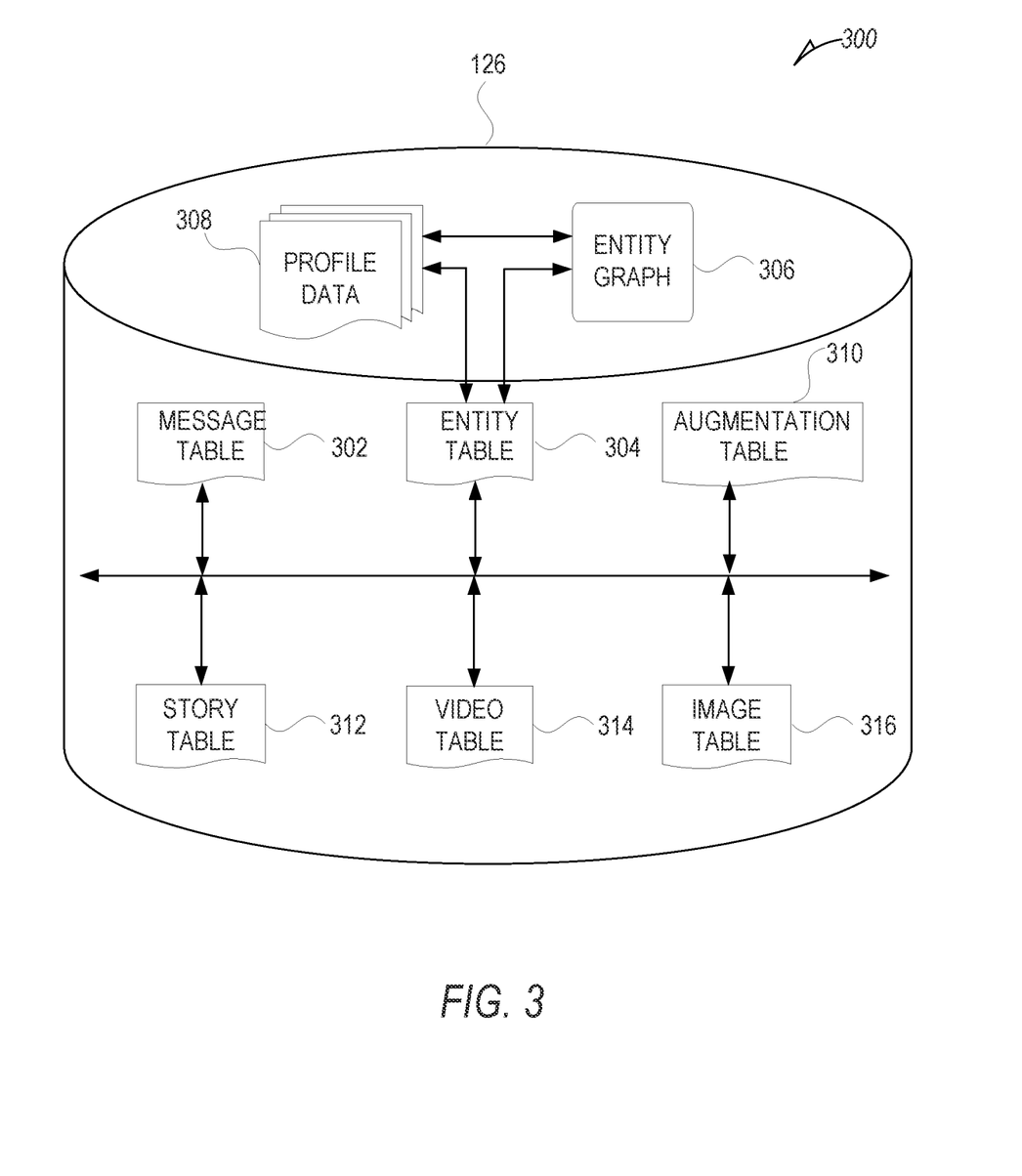
FIG. 3 is a diagrammatic representation of a data structure as maintained in a database, in accordance with some examples.

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities, for which records are maintained within the entity table 304, may include individuals, corporate entities, organizations, objects, places, events, and so forth. Regardless of entity type, any entity regarding which the messaging server system 108 stores data, may be a recognized entity. Each entity is provided with a unique identifier, as well as an entity type identifier.

The entity graph 306 stores information regarding relationships and associations between entities. Such relationships may be social, professional (e.g., work at a common corporation or organization) interested-based or activity-based, merely for example. The entity graph 306, includes a social graph that stores connection information that indicates relationships between profiles representing users in the messaging system.

The profile data 308 stores multiple types of profile data about a particular entity. For example, profile data may indicate a social network connection between two profiles or a contact book connection between two profiles. The profile data 308 may be selectively used and presented to other users of the messaging system, based on privacy settings specified by a particular entity. Where the entity is an individual, the profile data 308 includes, for example, a user name, telephone number, address, settings (e.g., notification and privacy settings), as well as a reference to the user's contact book.

Where the entity is a group, the profile data 308 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 316). Other augmentation data that may be stored within the image table 316 includes augmented reality content items (e.g., corresponding to applying Lenses or augmented reality experiences). An augmented reality content item may be a real-time special effect and sound that may be added to an image or a video.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Process Flow

Figure 4:
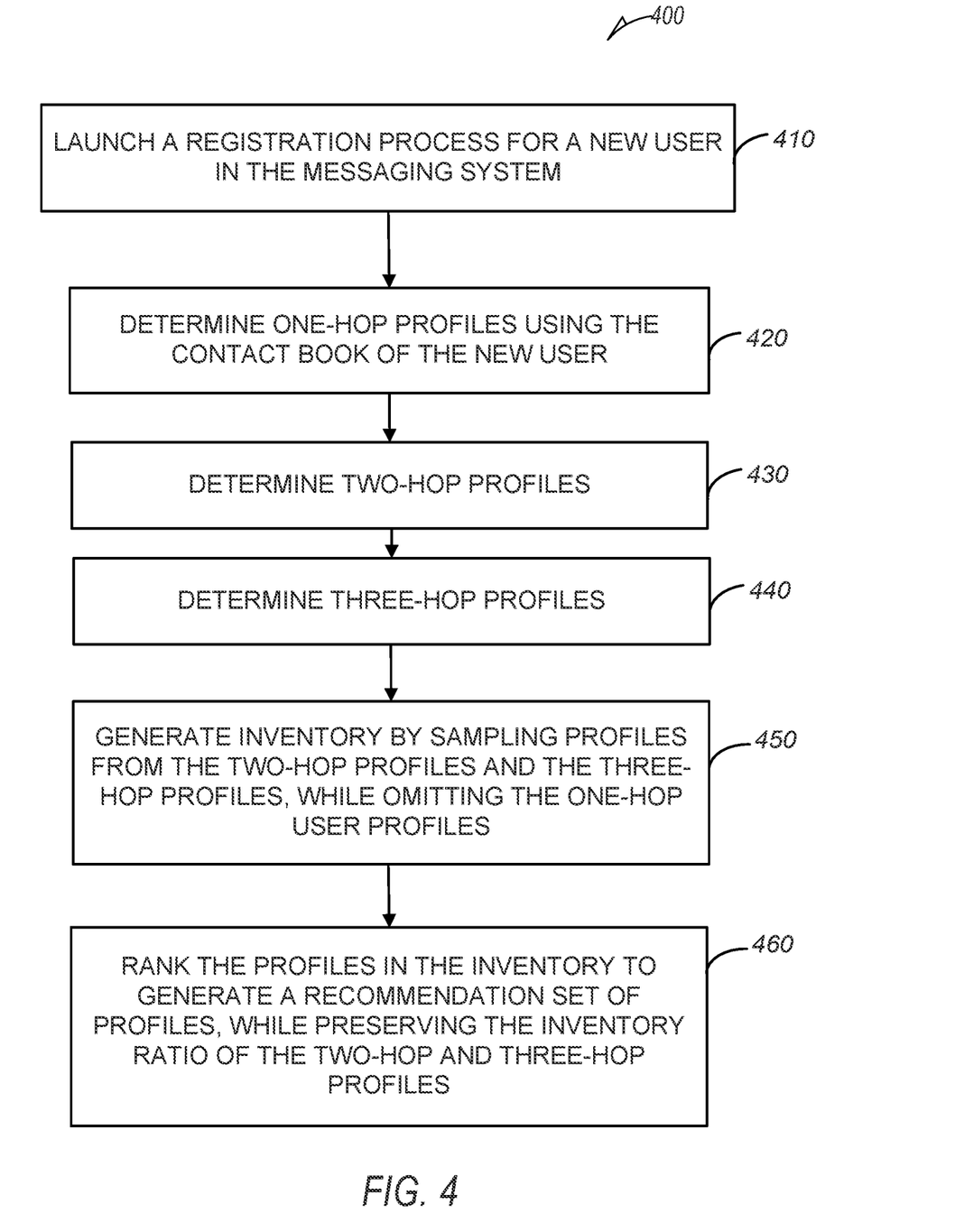
FIG. 4 is a flowchart of a method for providing connection recommendations in a privacy-safe manner, in accordance with some examples.

FIG. 4 is a flowchart of a method 400 for privacy-safe anonymized identity matching, in accordance with some examples. The method 400 may be performed by processing logic that may comprise hardware (e.g., dedicated logic, programmable logic, microcode, etc.), software, or a combination of both. In one example, some of the processing logic resides at the application servers 114 of FIG. 1. An example of the connection recommendation system referenced in the description of the method 400 is the connection recommendations system 208 of FIG. 2.

Although the described flowchart can show operations as a sequential process, many of the operations can be performed in parallel or concurrently. In addition, the order of the operations may be re-arranged. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems. The method 400 commences with operation 410.

At operation 410, a registration process is launched for a new user and a new profile representing the new user is created in the messaging system. The connection recommendations system obtains permission from the new user to access their contact book information that includes user identifiers and the respective associated contact information, such as phone numbers, for example. Based on the user identifiers from the contact book of the new user, the connection recommendations system determines contact book matches. Contact book matches are those profiles in the messaging system that correspond to respective user identifications in the contact book of the new user. For example, if the contact book includes an entry identifying George Michael, then a profile in the messaging system representing George Michaels a contact book match.

At operation 420, the connection recommendations system selects eligible contact matches based on the determined contact book matches and includes the eligible contact book matches into a set referred to as one-hop profiles for the purposes of this description. The eligible contact book matches are determined based on predetermined criteria, such as, for example, based on whether a profile, that is a contact book match, includes or references contact book information of a particular user. For example, the connection recommendations system may determine that a user identifier from the contact hook of the new user is associated with a candidate profile representing a user in the messaging system. Such profile is referred to as a candidate profile before it is determined that the profile is an eligible contact book match for being included into the set of one-hop profiles. If the identification of the new user is absent from the candidate profile, the connection recommendations system omits the candidate profile from inclusion into the set of one-hop profiles.

Other mechanisms that contribute to preserving privacy of the recommended profiles are as follows. In some examples, the connection recommendations system may be configured to proceed with the recommendations process only of the number of eligible contact book matches is equal to or greater than a predetermined threshold. In some examples, the connection recommendations system may be configured to sample independently at random (for example, selecting with a predetermined probability 0.03) a subset of the eligible contact book matches and drop them completely from further analysis thus generating negative noise.

After determining the eligible contact book matches, referred to as one-hop profiles for the purposes of this description, the connection recommendation system determines, from the one-hop profiles, the two-hop profiles, at operation 430. The two-hop profiles are those profiles that indicate connectedness with one or more of the one-hop profiles. Connectedness, also referred to as connection information, may indicate a contact book connection between two profiles or a social network connection between two profiles. As explained above, a contact book connection between two profiles in the messaging system is a connection where one profile includes or references contact book information of the user represented by the other profile, and a social network connection is a connection where two users of the messaging system each indicated consent to be each other's connections in the messaging system. Social network connection between two users represented by respective profiles in the messaging system does not require that either of the respective profiles includes or references a phone number or an email or other contact book information of the user represented by the other profile from the respective profiles.

In some examples, the connection recommendation system considers for inclusion into the set of two-hop profiles only those profiles that are associated with at least one profile from the one-hop profiles by means of a social network connection. In other examples, a candidate profile can be included into the set of two-hop profiles if it includes a reference to a profile from the one-hop profiles, even if such reference indicates a contact book connection rather than a social network connection. For example, the connection recommendation system determines a candidate profile referenced by the one-hop connection information, determines that the candidate profile includes a reference to a profile from the one-hop profiles, and, in response to the determining that the candidate profile includes a reference to the profile from the one-hop profiles, includes the profile in the two-hop profiles.

At operation 440, the connection recommendation system determines the three-hop profiles from the two-hop profiles. The three-hop profiles are those profiles that indicate connectedness with one or more of the two-hop profiles. In some examples, the connection recommendation system considers for inclusion into the set of three-hop profiles only those profiles that are associated with at least one profile from the two-hop profiles by means of a social network connection. In some examples, the connection recommendations system samples profiles from the two-hop profiles with a predetermined probability and uses only the sampled two-hop profiles for generating the set of three-hop profiles for the inventory. The three-hop profiles represent positive noise generated using a predetermined sampling probability. The connection recommendations system may be configured to calculate the probability (p), with which to sample the two-hop profiles, based on the size (k) of the contact book of the new user, using Equation 1 below, for example.

$$p=2*0.07/k \quad \text{Equation 1}$$

At operation 450, the connection recommendation system samples the two-hop profiles and the three-hop profiles, while omitting the one-hop profiles, in order to generate inventory, from which connection recommendations can be selected. The inventory has a ratio between profiles from the two-hop profiles and profiles from the three-hop profiles.

At operation 460, the connection recommendation system ranks the profiles in the inventory, and generates a recommendation set of profiles in such a manner that the ratio between profiles from the two-hop profiles and profiles from the three-hop profiles in the recommendation set of profiles is the same as in the inventory. The ranking may be performed using any ranking methodology, including matching of features associated with profiles in the inventory, using machine learning models for predicting whether a new social network connection would be created based on recommending a profile from the inventory to the new user at registration time, and so on. For example, the connection recommendations system executes a ranking model to generate a preliminary recommendation set of profiles, determines that a preliminary ratio between profiles from the two-hop profiles and profiles from the three-hop profiles in the preliminary recommendation set of profiles is different from the corresponding ratio in the inventory, and includes, into the preliminary recommendation set of profiles, an additional profile from the two-hop profiles or from the three-hop profiles to adjust the preliminary ratio such that it becomes substantially the same as the corresponding ratio in the inventory.

Figure 5:
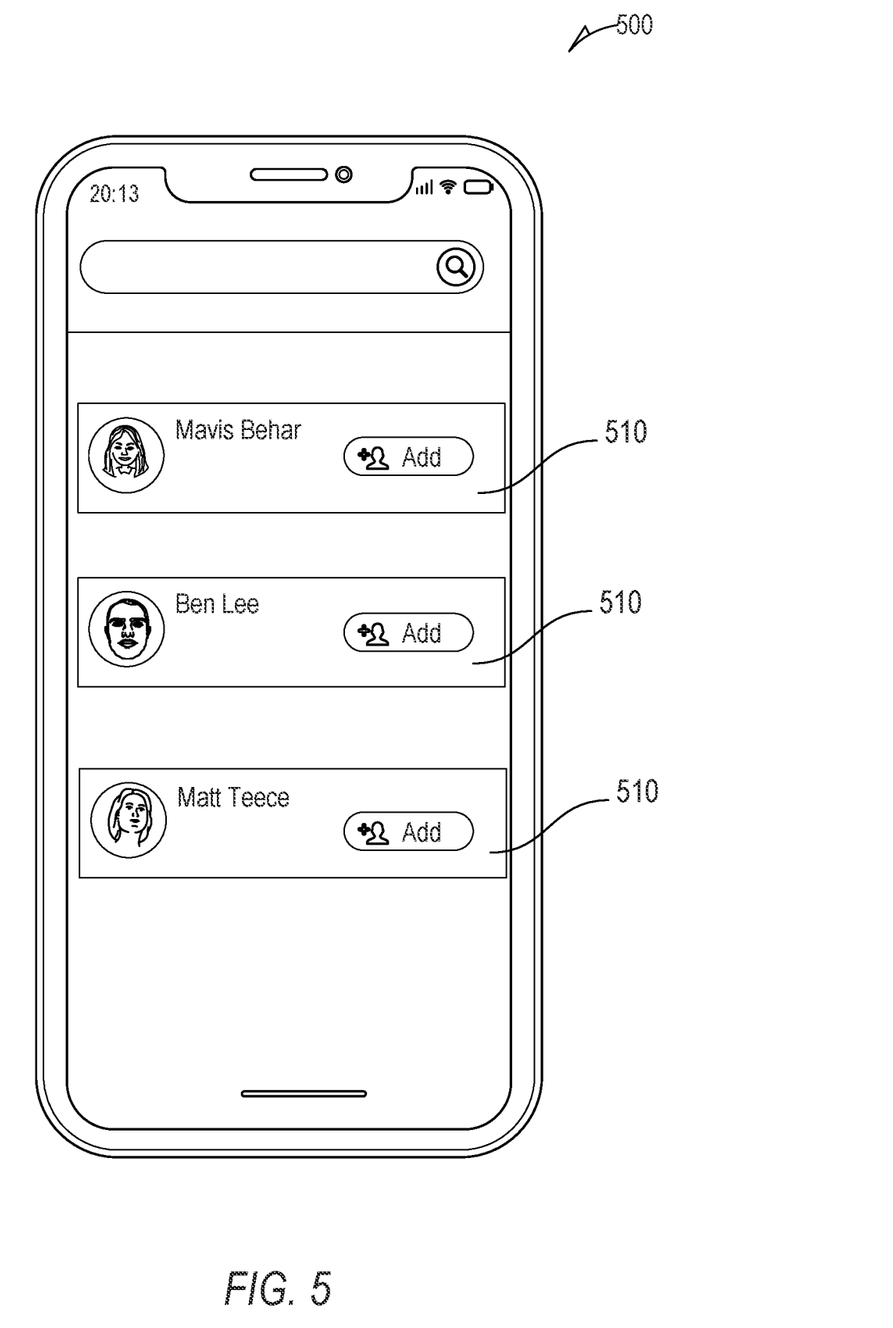
FIG. 5 is a user interface illustrating connection recommendations generated in a privacy-safe manner, in accordance with some examples.

Preserving the ratio between profiles from the two-hop profiles and profiles from the three-hop profiles in the generated recommendation set of profiles contributes to keeping the new user ignorant of which recommended profiles represent users connected to people from their contact book (profiles from the set of two-hop profiles) and which recommended profiles represent users connected to connections of people who are from their contact book (profiles from the three-hop set of profiles). The recommendation set of profiles generated by the connection recommendations system, which may include two-hop profiles and three-hop profiles, is presented on a display device of the new user. An example user interface 500 illustrating connection recommendations 510 generated in a privacy-safe manner, in accordance with some examples described herein, is shown in FIG. 5.

The process of identifying the one-hop, two-hop, and three-hop profiles for a new user may be described as generating a graph with nodes representing the new user's profile, respective profiles from the one-hop profiles, respective profiles from the two-hop profiles, and respective profiles from the three-hop profiles. The nodes representing the one-hop profiles can be referred to as one-hop nodes; the nodes representing the two-hop profiles can be referred to as two-hop nodes; and nodes representing the three-hop profiles can be referred to as three-hop nodes. The edges in such graph represent connection information between the respective profiles. Because respective connections between the new user's profile and the one-hop profiles are contact book connections, while a connection between a one-hop profile and a two-hop profile may be a social network connection, a graph generated in this manner is referred to as a hybrid graph. The recommendations for presentation to the new user are selected from the two-hop and the three-hop nodes.

As stated above, the connection recommendations system can be configured to generate a recommendation set of profiles in such a manner that the ratio between profiles from the two-hop profiles and profiles from the three-hop profiles in the recommendation set of profiles is the same as in the inventory. In some examples, where the edges between the on-hop and two-hop nodes and/or between the second and three-hop nodes are permitted to be of different types, depending on the connections between the profiles represented by the respective nodes, the number of recommendation categories increases from just two (recommendations selected from the two-hop and the three-hop nodes) upwards. For example, some recommendations corresponding to a two-hop node may be associated with a social network connection, while other recommendations corresponding to a two-hop node may be associated with a contact book connection. Permitting the contact book edges to be either inlink or outlink, as opposed to strictly bidirectional, yields more categories still. Ensuring that the ratio between recommendation sets of profiles from several different categories in the ranked recommendations is the same or substantially the same as in the inventory, may be referred to as rebalancing, for the purposes of this description. Rebalancing may be achieved by removing one or more profiles from categories that have, proportionally, more candidate recommendations in the ranked set than in the inventory. In some embodiments, rebalancing may be achieved by adding one or more profiles to categories that have, proportionally, fewer candidate recommendations in the ranked set than in the inventory.

Machine Architecture

Figure 6:
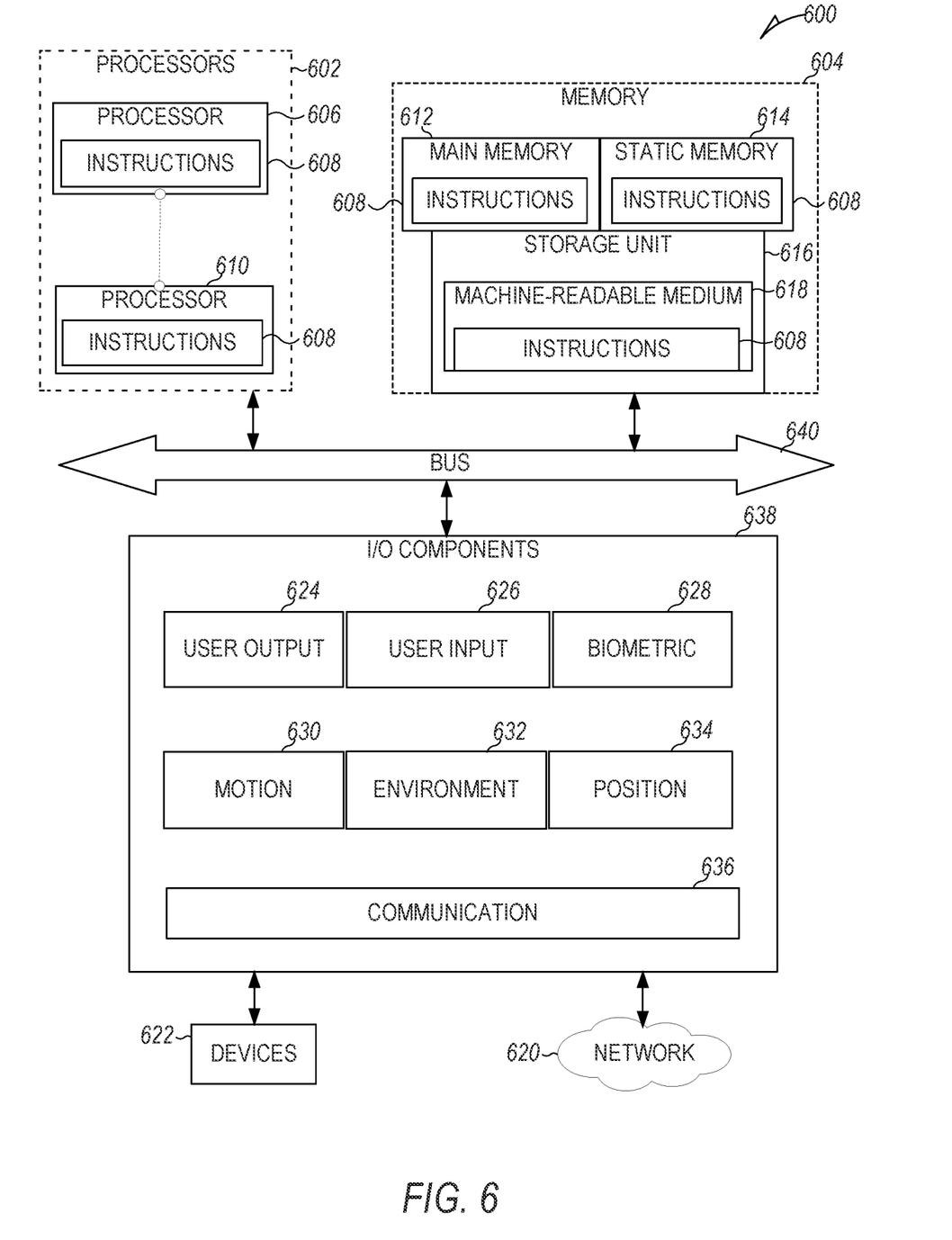
FIG. 6 is a diagrammatic representation of a machine in the form of a computer system, in accordance with some examples within which a set of instructions may be executed for causing the machine to perform any one or more of the methodologies discussed herein, in accordance with some examples.

FIG. 6 is a diagrammatic representation of the machine 600 within which instructions 608 (e.g., software, a program, an application, an applet, an app, or other executable code) for causing the machine 600 to perform any one or more of the methodologies discussed herein may be executed. For example, the instructions 608 may cause the machine 600 to execute any one or more of the methods described herein. The instructions 608 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 608, sequentially or otherwise, that specify actions to be taken by the machine 600. Further, while only a single machine 600 is illustrated, the term "machine" shall also be taken to include a collection of machines that individually or jointly execute the instructions 608 to perform any one or more of the methodologies discussed herein. The machine 600, for example, may comprise the client device 102 or any one of a number of server devices forming part of the messaging server system 108. In some examples, the machine 600 may also comprise both client and server systems, with certain operations of a particular method or algorithm being performed on the server-side and with certain operations of the particular method or algorithm being performed on the client-side.

The machine 600 may include processors 602, memory 604, and input/output I/O components 638, which may be configured to communicate with each other via a bus 640. In an example, the processors 602 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 606 and a processor 610 that execute the instructions 608. The term "processor" is intended to include multi-core processors that may comprise two or more independent processors (sometimes referred to as "cores") that may execute instructions contemporaneously. Although FIG. 6 shows multiple processors 602, the machine 600 may include a single processor with a single-core, a single processor with multiple cores (e.g., a multi-core processor), multiple processors with a single core, multiple processors with multiples cores, or any combination thereof.

The memory 604 includes a main memory 612, a static memory 614, and a storage unit 616, both accessible to the processors 602 via the bus 640. The main memory 604, the static memory 614, and storage unit 616 store the instructions 608 embodying any one or more of the methodologies or functions described herein. The instructions 608 may also reside, completely or partially, within the main memory 612, within the static memory 614, within machine-readable medium 618 within the storage unit 616, within at least one of the processors 602 (e.g., within the Processor's cache memory), or any suitable combination thereof, during execution thereof by the machine 600.

The I/O components 638 may include a wide variety of components to receive input, provide output, produce output, transmit information, exchange information, capture measurements, and so on. The specific I/O components 638 that are included in a particular machine will depend on the type of machine. For example, portable machines such as mobile phones may include a touch input device or other such input mechanisms, while a headless server machine will likely not include such a touch input device. It will be appreciated that the I/O components 638 may include many other components that are not shown in FIG. 6. In various examples, the I/O components 638 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 638 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 include acceleration sensor components (e.g., accelerometer), gravitation sensor components, rotation sensor components (e.g., gyroscope).

The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 638 further include communication components 636 operable to couple the machine 600 to a network 620 or devices 622 via respective coupling or connections. For example, the communication components 636 may include a network interface Component or another suitable device to interface with the network 620. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 622 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 612, static memory 614, and memory of the processors 602) and storage unit 616 may store one or more sets of instructions and data structures (e.g., software) embodying or used by any one or more of the methodologies or functions described herein. These instructions (e.g., the instructions 608), when executed by processors 602, cause various operations to implement the disclosed examples.

The instructions 608 may be transmitted or received over the network 620, using a transmission medium, via a network interface device (e.g., a network interface component included in the communication components 636) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 622.

Software Architecture

Figure 7:
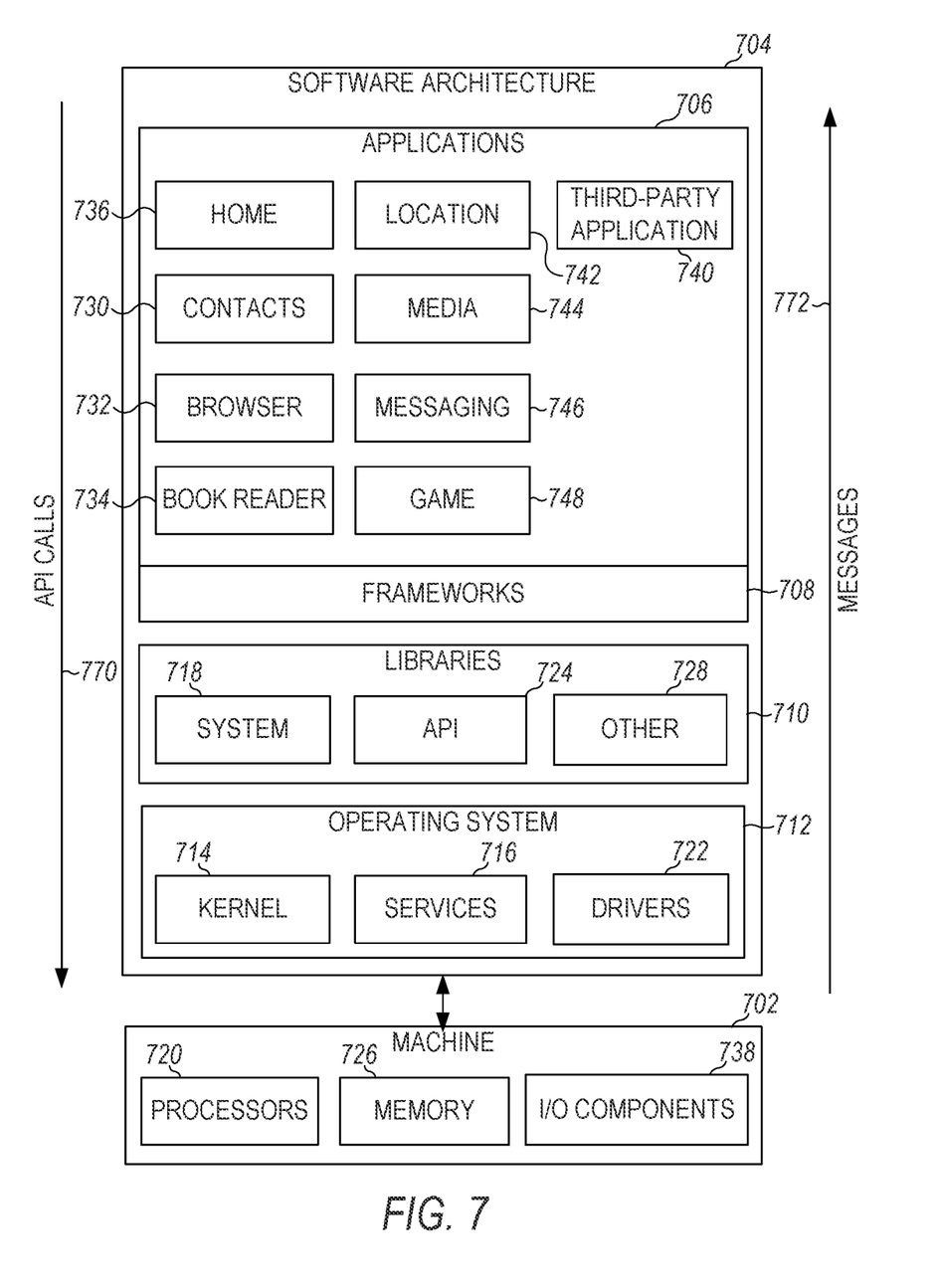
FIG. 7 is a block diagram showing a software architecture within which examples may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 770 through the software stack and receive messages 772 in response to the API calls 770.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 770 provided by the operating system 712 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 602 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/ modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
in a messaging system for exchanging data over a network, launching a registration process with respect to a new user profile representing a new user in the messaging system, the new user profile associated with a contact book comprising user identifiers;
determining one-hop profiles using the user identifiers from the contact book;
determining two-hop profiles using one-hop connection information associated with the one-hop profiles;
determining three-hop profiles using two-hop connection information associated with the two-hop profiles;
generating inventory by sampling profiles from the two-hop profiles and the three-hop profiles, while omitting the one-hop profiles, the inventory having an inventory ratio between profiles from the two-hop profiles and profiles from the three-hop profiles;
ranking the profiles in the inventory to generate a recommendation set of profiles, while preserving the inventory ratio; and
causing presentation of the recommendation set of profiles on a display device of the new user.

2. The method of claim 1, wherein the one-hop profiles each include contact book information identifying a first user.

3. The method of claim 1, wherein the determining of the one-hop profiles comprises: determining that a user identifier from the contact book is associated with a candidate profile representing a user in the messaging system; determining that an identification of the new user is absent from the candidate profile; and omitting the candidate profile from inclusion into the one-hop profiles.

4. The method of claim 1, wherein each profile from the one-hop profiles includes connection information indicating at least a predetermined number of social network connections.

5. The method of claim 1, wherein the determining of the two-hop profiles comprises determining that a number of profiles in the one-hop profiles is equal to or greater than a predetermined threshold.

6. The method of claim 1, wherein the determining of the two-hop profiles using one-hop connection information associated with the one-hop profiles comprises determining a candidate profile referenced by the one-hop connection information; determining that the candidate profile includes a reference to a profile from the one-hop profiles; and in response to the determining that the candidate profile includes a reference to the profile from the one-hop profiles, including the profile in the two-hop profiles.

7. The method of claim 1, wherein the one-hop connection information is a social network connection.

8. The method of claim 1, wherein the one-hop connection information is a contact book connection.

9. The method of claim 1, wherein the preserving of the inventory ratio between profiles from the two-hop profiles and profiles from the three-hop profiles comprises: executing a ranking model to generate a preliminary recommendation set of profiles; determining that a preliminary ratio between profiles from the two-hop profiles and profiles from the three-hop profiles in the preliminary recommendation set of profiles is different from the inventory ratio; and including an additional profile from the two-hop profiles or from the three-hop profiles to adjust the preliminary ratio.

10. The method of claim 1, comprising obtaining, from the new user, consent to access the contact book to the messaging system.

11. A system comprising:
one or more processors; and
a non-transitory computer readable storage medium comprising instructions that when executed by the one or processors cause the one or more processors to perform operations comprising:
in a messaging system for exchanging data over a network, launching a registration process with respect to a new user profile representing a new user in the messaging system, the new user profile associated with a contact book comprising user identifiers;
determining one-hop profiles using the user identifiers from the contact book;
determining two-hop profiles using one-hop connection information associated with the one-hop profiles;
determining three-hop profiles using two-hop connection information associated with the two-hop profiles;
generating inventory by sampling profiles from the two-hop profiles and the three-hop profiles, while omitting the one-hop profiles, the inventory having an inventory ratio between profiles from the two-hop profiles and profiles from the three-hop profiles;
ranking the profiles in the inventory to generate a recommendation set of profiles, while preserving the inventory ratio; and
causing presentation of the recommendation set of profiles on a display device of the new user.

12. The system of claim 11, wherein the one-hop profiles each include contact book information identifying a first user.

13. The system of claim 11, wherein the determining of the one-hop profiles comprises: determining that a user identifier from the contact book is associated with a candidate profile representing a user in the messaging system; determining that an identification of the new user is absent from the candidate profile; and omitting the candidate profile from inclusion into the one-hop profiles.

14. The system of claim 11, wherein each profile from the one-hop profiles includes connection information indicating at least a predetermined number of social network connections.

15. The system of claim 11, wherein the determining of the two-hop profiles comprises determining that a number of profiles in the one-hop profiles is equal to or greater than a predetermined threshold.

16. The system of claim 11, wherein the determining of the two-hop profiles using one-hop connection information associated with the one-hop profiles comprises determining a candidate profile referenced by the one-hop connection information; determining that the candidate profile includes a reference to a profile from the one-hop profiles; and in response to the determining that the candidate profile includes a reference to the profile from the one-hop profiles, including the profile in the two-hop profiles.

17. The system of claim 11, wherein the one-hop connection information is a social network connection.

18. The system of claim 11, wherein the one-hop connection information is a contact book connection.

19. The system of claim 11, wherein the preserving of the inventory ratio between profiles from the two-hop profiles and profiles from the three-hop profiles comprises: executing a ranking model to generate a preliminary recommendation set of profiles; determining that a preliminary ratio between profiles from the two-hop profiles and profiles from the three-hop profiles in the preliminary recommendation set of profiles is different from the inventory ratio; and including an additional profile from the two-hop profiles or from the three-hop profiles to adjust the preliminary ratio.

20. A machine-readable non-transitory storage medium having instruction data executable by a machine to cause the machine to perform operations comprising:
in a messaging system for exchanging data over a network, launching a registration process with respect to a new user profile representing a new user in the messaging system, the new user profile associated with a contact book comprising user identifiers;
determining one-hop profiles using the riser identifiers from the contact book;
determining two-hop profiles using one-hop connection information associated with the one-hop profiles;
determining three-hop profiles using two-hop connection information associated with the two-hop profiles;
generating inventory by sampling profiles from the two-hop profiles and the three-hop profiles, while omitting the one-hop profiles, the inventory having an inventory ratio between profiles from the two-hop profiles and profiles from the three-hop profiles;
ranking the profiles in the inventory to generate a recommendation set of profiles, while preserving the inventory ratio; and
causing presentation of the recommendation set of profiles on a display device of the new user.

* * * * *